Feb. 21, 1939.                C. H. WHITE                 2,147,726
                         PLANTING MECHANISM
                      Filed March 14, 1936        2 Sheets-Sheet 1
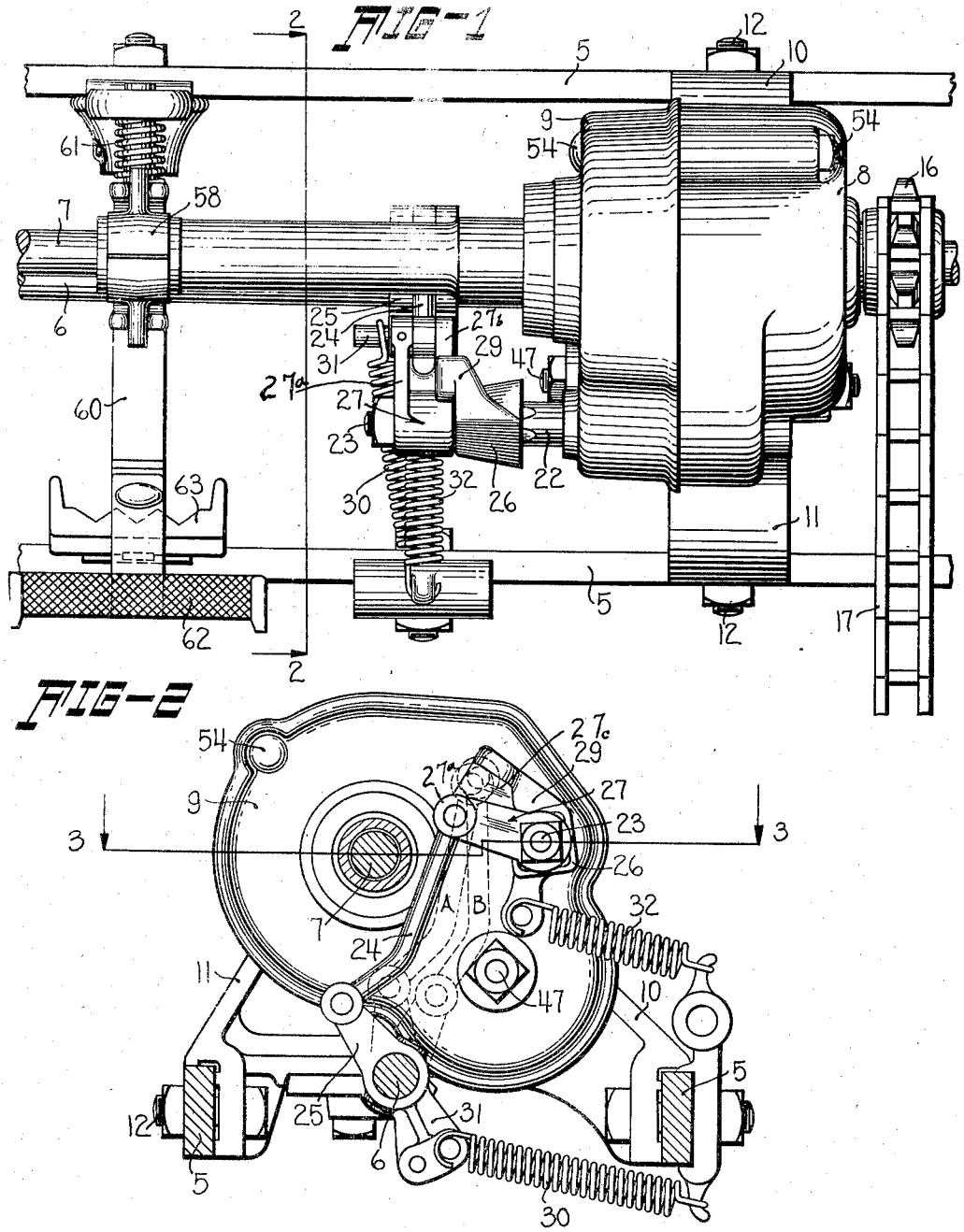

Feb. 21, 1939. C. H. WHITE 2,147,726
PLANTING MECHANISM
Filed March 14, 1936 2 Sheets-Sheet 2
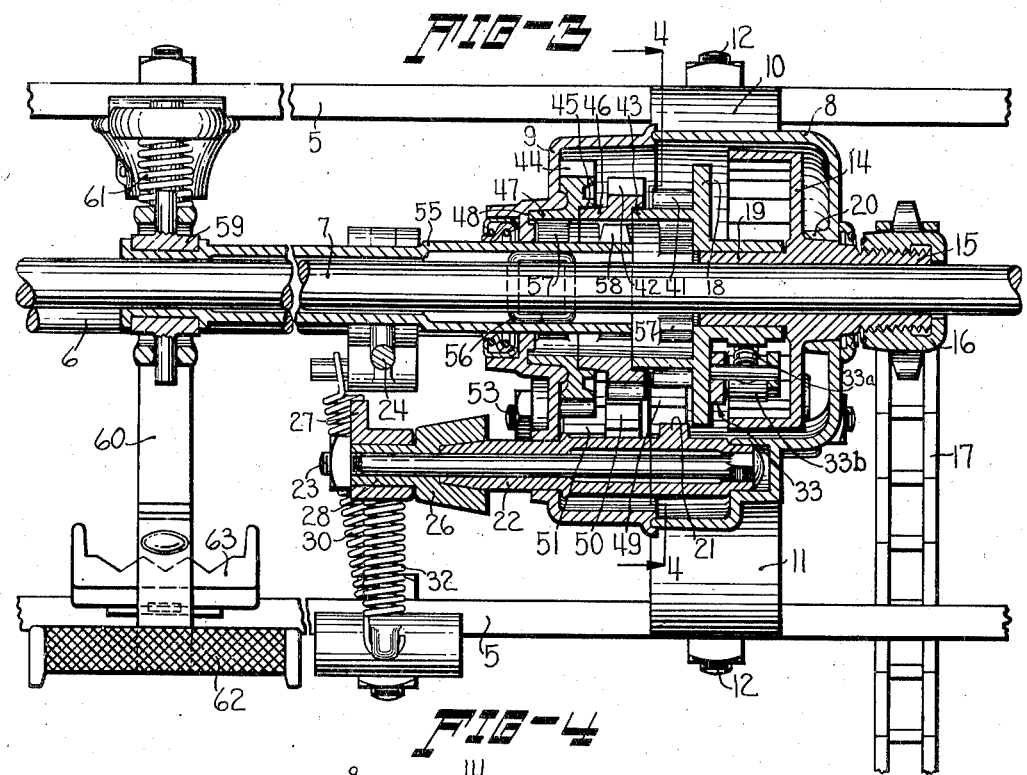
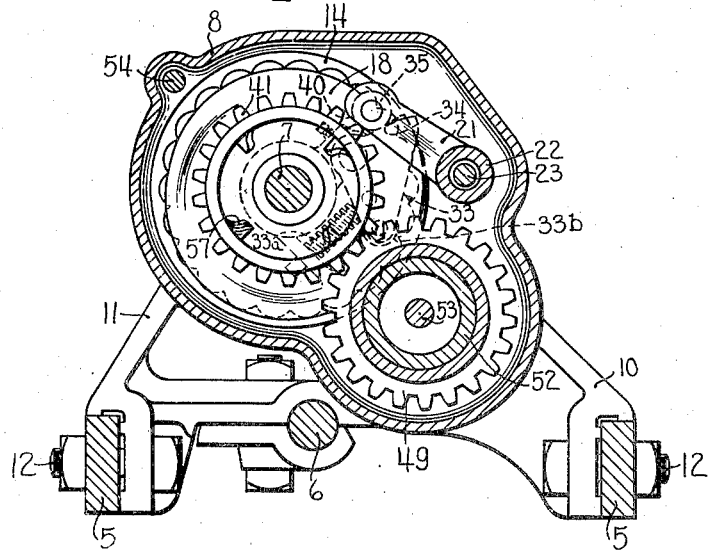
INVENTOR
Charles H. White,
BY
Brown, Jackson, Boettcher & Dienner
ATTORNEYS.

Patented Feb. 21, 1939

2,147,726

UNITED STATES PATENT OFFICE 2,147,726

PLANTING MECHANISM

Charles H. White, Moline, Ill., assignor to Deere & Company, Moline, Ill., a corporation of Illinois Application March 14, 1936, Serial No. 68,832

19 Claims. (Cl. 111—38)

This invention relates to improvements in check-row corn planters of the type in which the seed selecting mechanism operates at intervals determined by the movements of a check-fork-controlled rock shaft to deliver an optionally variable number of seed kernels to a hill, the kernels being selected by the seeding mechanism one by one from the mass of seed contained in the seed hopper of the planter.

A planter of this general type is fully illustrated and described in Patent No. 1,236,028, dated August 7, 1917, to Charles E. White, and the present invention contemplates certain improvements in the seed selecting mechanism illustrated in that patent.

In the past, as shown for example in the above-mentioned patent, both the driven member and the driving member of the clutch were journaled on the seed selecting shaft, and it has been found in practice that when the clutch is engaged so that the driving member and driven member thereof rotate in unison the seed selecting shaft is placed under an appreciable shearing stress, due to the toggle action between the driving and driven members of the clutch which results in friction being set up between the three members (the two clutch members and the shaft). This is so because when the driven member of the clutch is engaged with the driving member thereof the point at which the roller on the dog carried by the driven clutch member engages the interior notches in the driving member, the point at which the dog is pivoted to the driven member, and the center of the seed selecting shaft are sufficiently close to being in a straight-line position to set up a strong tendency for the driving member to move in one direction and the driven member to move in the opposite direction. It has been found that by so positioning the parts that the angle subtended by the three above-mentioned points is nearer to 90°, the tendency for the clutch members to be forced in opposite directions is to some extent eliminated. This tendency, however, is not entirely eliminated, due to the fact that the turning moment is transmitted from one clutch member to the other through a single arm connection. This angle tends to increase with wear, also.

While this single arm connection transmits a turning moment to the driven clutch member, it also sets up a force to move the two clutch members in opposite directions, which force results in friction between the driving member of the clutch and the seed selecting shaft. This resultant friction is sufficiently high at times to interfere with the proper rotation of the shaft, articularly as this shaft rotates at a slower speed than the clutch members in two of the settings of the sliding sleeve on the shaft that controls the number of seeds selected at each operation of the clutch. It may happen in such a construction that the shaft will be rotated by its frictional contact with the clutch members beyond its normal amount of rotation and cause the lug on the sleeve to separate from the lug on the reduction gear through which it is, or should be, driven, and in that event the shaft would be rotated a certain amount farther than it should have been, with the result that it may cause an additional seed to be selected,—four, instead of three, for example, which, of course, is not desirable.

In the construction shown in the above mentioned patent, also, frictional stress was imposed on the seed selecting shaft by the driving member of the clutch whenever relative rotation occurred therebetween, as when the seed selecting shaft is not rotating, this being due to the pull of the driving chain by which the driving member of the clutch is continuously rotated. This pull tends to twist the driving member on the seed selecting shaft, and if not resisted interferes with the proper rotation of the seed selecting shaft.

With the above in view, it is the principal object of the present invention to provide a construction in which the shearing stresses imposed on the seed selecting shaft by the driving and driven members of the clutch when engaged with each other are practically eliminated.

Another object of the invention is to provide improvements in the mounting of the seed selecting mechanism whereby the frictional stress imposed on the seed selcting shaft due to the pull of the driving chain whenever relative rotation occurs therebetween is eliminated.

A further advantageous feature of the present invention is that all of the seed selecting mechanism, the reduction gears and also the clutch parts, are enclosed within a single housing, which is partially filled with oil, whereby all of the rotating parts are kept well lubricated at all times and are shielded against dirt and dust.

Other objects and advantageous features of the present invention will appear from the following description of the preferred embodiment thereof illustrated in the accompanying drawings, in which—

Figure 1 is a top plan view of a portion of a check-row corn planter equipped with my improved seed selecting mechanism, and illustrating the housing enclosing the clutch and the reduction gears of such mechanism;

Figure 2 is a vertical cross-sectional view taken on the plane of the line 2—2 of Figure 1 and illustrating the mechanism controlled by the check-fork-controlled rock shaft for actuating the clutch mechanism;

Figure 3 is a horizontal cross-sectional view taken on the plane of the line 3—3 of Figure 2 and illustrating the details of the improved seed selecting mechanism contained within the housing; and Figure 4 is a vertical cross-sectional view taken on the plane of the line 4—4 of Figure 3 and illustrating the clutch throw-out arm or lever which is operated by the check-fork-controlled rock shaft to permit engagement of the driving and driven elements of the clutch.

Referring to the drawings, only such parts of the planter as are necessary to an understanding of the present invention have been illustrated, and reference may be had, if desired, to the above-mentioned patent for a showing and description of the various parts of the complete planter. The two longitudinally spaced transversely extending bars of the seeder frame which is pivotally connected to the forward end of the main frame of the planter are indicated by the numeral 5 and are connected together at their outer ends by check-heads and by intermediate brackets not shown. This seeder frame carries the runners with seed tubes, the seed hoppers, and the seeding mechanism, and as the present invention is concerned mainly with the seed selecting mechanism only the latter mechanism has been illustrated in the accompanying drawings and will be described herein.

As is usual in planter constructions of this type, the seed selecting mechanism of the present invention is operated at intervals determined by the movement of a check-fork-controlled rock shaft 6 through a seeder shaft 7. The shaft 7 is operated intermittently through the instrumentality of a suitable clutch mechanism, the driving element of which is continuously rotated by power derived from the rear axle of the planter, and a suitable gear assembly adapted to be operated by the driven member of the clutch, as will be later described.

The clutch and gear assembly of the present invention are enclosed within a suitable housing comprising the members 8 and 9. The member 8 of the housing is provided with suitable flanges 10 and 11 cast integral therewith, such flanges being secured to the frame bars 5 by bolts 12. The members 8 and 9 of the housing are connected together to form a lubricant containing casing as will be later described.

As best shown in Figure 3, the driving member 14 of the clutch is journaled on the seeder shaft 7 and is provided with an enlongated outwardly extending sleeve or bearing portion 15 that extends through the side wall of the housing section 8 and has secured thereon at its outer end a sprocket 16 whereby the driving member 14 of the clutch is continuously rotated by power from the rear axle of the planter through a chain 17. The bearing sleeve 15, as shown in Figure 3, has bearing support within a bearing formed by an annular flange 20 integral with and extending inwardly from the side wall of the housing member 8, the purpose of which flange will be hereinafter described.

The driven member of the clutch is indicated by the numeral 18, and it is journaled on an annular bearing support 19 formed integral with and extending laterally from the driving member 14 in the direction opposite to that of the sleeve 15. The purpose of so journaling the driven member 18 on the driving member 14 will be explained later herein. As shown in Figure 4, the outer periphery of the driven clutch member is formed eccentric with the axis thereof to provide a cam surface, and a clutch throw-out arm or lever 21 formed integral with or fixedly mounted on a hollow counter-shaft 22 projecting through the side wall of the housing member 9, as shown in Figure 3, is provided with a roller 35 which rides on the cam-shaped periphery of the driven clutch member to provide delayed return of said throw-out arm to clutch disengaging position until the driven clutch member 18 has made one complete revolution as hereinafter described. The clutch throw-out arm 21 is controlled by the movement of the rock shaft 6 through mechanism which will now be described.

As shown in Figure 3, a bolt 23 extends through the counter-shaft 22, the purpose of which will be hereinafter described. A link 24 is pivotally connected at one end to an arm 25 fixed to the rock-shaft and having its opposite end pivotally connected to the outer end of one member 27 of a lost-motion connection comprising members 26 and 27. The counter-shaft 22 is provided with a squared outer end on which the square socket of the member 26 of the lost motion connection is mounted, and the member 27 is provided with a bearing portion that is journaled on a hub 28 of the arm 26, and the bolt 23 which extends through the counter-shaft 22 as above described serves to hold these several parts in position. The member 27 comprises a pair of spaced arms 27a and 27b extending outwardly from the bearing portion thereof, and the link 24 is pivotally connected to the member 27 between said arms 27a and 27b (Figure 1). As shown in Figure 1, the member 26 of the lost motion connection is provided with a laterally extending arm 29 having a portion disposed above a lug 27c (Figure 2) on the arm 27b of the member 27, as best shown in Figure 1, so that said arm 29 will be contacted and moved by the arm 27b of the member 27 when the latter is moved by the link 24 upon actuation of the rock-shaft 6. A spring 30 connected at one end to an arm 31 fast on the rock-shaft 6 and at its other end to a suitable frame fastening holds the rock-shaft and the several parts connected therewith in normal position, and acts to return them to normal position after each actuation of the rock-shaft, and a spring 32 connected at one end to a lateral extension of the member 29 of the lost motion connection and at its opposite end to a suitable frame fastening acts to return the member 29 to normal position after each actuation thereof.

As shown in Figures 3 and 4, the driven clutch element 18 has a spring pressed pawl 33 pivoted thereto, said pawl carrying a roller 33b and having a cam surface 34 engaged by the roller 35 carried by the throw-out lever 21. In the illustrated construction the parts are shown in the positions they occupy when the driving and driven clutch elements are disconnected, and the parts are held in this position by the spring 32. In the operation of the mechanism, when the rock-shaft 6 is rocked by the check-wire the link 24 and member 27 of the lost motion connection are moved against the action of the spring 30, and the arm 27b of the member 27 moves the arm 29 of the lost motion connection against the action of the spring 32. This movement of the arm 29 rocks the shaft 22 and moves the throw-out arm 21 fast thereon in a clockwise direction as viewed in Figure 4 into a position to carry its roller 35 away from the cam surface 34 of the pawl 33, which movement permits the pawl 33 to move under the action of its spring 33a to bring its roller 33b into one of the interior notches in the driving element 14 of the clutch and so engage the two clutch elements. As the driven clutch element rotates with the driving clutch element the roller 35 journaled on the clutch throw-out arm 21 rides around on the cam-shaped periphery of the driven clutch element for a complete revolution, at which time it drops to the low point on the cam, indicated in Figure 4 by the numeral 40, under the action of the spring 32 to again move the roller 35 into engagement with the cam surface 34 of the pawl to move the pawl 33 on its pivot and carry the roller 33b out of the notch in the driving member of the clutch and so disengage the clutch elements.

In this connection it is well to point out that due to the manner in which the check-fork engages the check-wire, the rock-shaft 6 always rocks through an angle of about 60° at each actuation thereof, moving the link 24 and the member 27 into the dotted line position indicated at B in Figure 2, but the connections between the rock-shaft 6 and the auxiliary arm 29 on the counter-shaft 22 are such that the counter-shaft is rocked only through an angle of about 30°. With this construction, therefore, it is necessary to provide only for the latter amount of movement of the throw-out arm 21 in the casing, with the result that the size of the casing is kept down to a minimum. Furthermore, the connections are such that this reduced movement imparted to the counter-shaft is not obtained at a sacrifice of speed of operation of the clutch responsive to the actuation of the rock-shaft because these several connections are so arranged that the entire movement of the countershaft necessary to cause actuation of the clutch is produced by the first or initial part of the movement of the rock shaft, i. e., the movement of the rock shaft necessary to move the link 24 to the dotted line position indicated at A. An important feature of this arrangement of the parts is that it has made it possible to position the countershaft 22 in the casing at a point in line with or slightly above the normal oil level carried in the casing, without disturbing the regular position of the rock-shaft which is below the axis of the seed selecting shaft. As a result, leakage of oil through the opening in the casing through which the counter-shaft extends is substantially eliminated without the necessity of providing special packing for such opening.

It will be apparent from the above description of the engaging and disengaging of the clutch elements that the clutch cycle in the machine of the present application is one complete revolution of the driven clutch element 18, the cycle commencing with the action of a tappet on the check-wire and closing under the action of the spring 32, operating as above described.

The lost motion connection in the operating linkage connecting the rock shaft 6 with the clutch throw-out arm 21 which is provided by the members 26 and 27 above described, provides for delayed return of the clutch throw-out arm 21 relative to the return movement of the rock shaft 6 to normal position upon release of the tappet by the check fork, and permits the rock shaft to be swung quickly back to normal position under the action of the spring 30 without having to wait until the clutch throw-out arm 21 returns to its normal position, as will be readily understood.

During each revolution of the driven clutch element 18, the seeder shaft 7 is turned through a full revolution, a half revolution, or three-fourths of a revolution, whereby the seed selecting mechanism releases a variable number of seeds, and this is accomplished by suitable gear mechanism which will now be described.

Suitably secured to the driven element 18 of the clutch is a spur gear 41 of relatively small diameter. A similar gear 42 of larger diameter is mounted in part on a laterally extending offset portion or flange 43 on the gear 41. A still larger similar gear 44 is provided, said gear having a hub member 45 at one side mounted on a laterally extending offset portion or flange 46 of the gear 42 and a laterally extending offset portion or flange 47 at its opposite side which is journaled in a recess 48 in the side wall of the housing member 9. The purpose of so mounting the gears 41, 42 and 44 will be later described. A triple gear unit, comprising gears 49, 50 and 51 rigidly secured together and of which the larger gear 49 is in mesh with the smaller gear 41 fast on the driven member of the clutch, the intermediate gear 50 is in mesh with the intermediate gear 42 and the smaller gear 51 is in mesh with the larger gear 44, is journaled on a hollow bearing 52 which is held in place by a bolt 53, said bolt extending through the side walls of the housing members 8 and 9 and also acting to secure said housing sections together. The housing sections are further secured together at their opposite sides by a bolt 54.

As shown in Figure 3, a sleeve 55 surrounds the seeder shaft 7 and is keyed thereon as shown at 56 so as to rotate therewith but have longitudinal movement with respect to said shaft. The gears 41, 42 and 44 are each provided with internal teeth or lugs 57 adapted to be engaged by projections or teeth 58 on the inner end of the sleeve 55. As shown in Figure 4, there are four of these teeth 57 provided on each of the gears 41, 42 and 44.

The several gears 41, 42, 44, 49, 50 and 51 are each provided with a predetermined number of teeth whereby definite proportions and ratios are maintained. It will be remembered that the gear 41 is driven through exactly one revolution at each actuation of the clutch, and the proportions of the several other gears is such that the gear 42 which is driven by the gear 50 of the triple gear unit will rotate through three-fourths of a revolution for each complete revolution of the gear 41, and the gear 44 which is driven by the gear 51 of the triple gear unit will rotate through one-half of a revolution for each complete revolution of the gear 41. The above-mentioned internal driving teeth 57 on the gears 41, 42 and 44 are positioned ninety degrees apart, and it is obvious that the teeth of the several gears will come into alinement at the end of each clutch actuation.

It will be obvious that by connecting one or another of the gears 41, 42 or 44 to the seeder shaft 7 through the sleeve 55 by the lug 58 on the sleeve engaging with the interior teeth 57 on one or another of said gears, the speed of rotation of the shaft can be varied, or, in other words, the extent of rotation for each complete revolution of the clutch can be varied. In the illustrated construction the shaft will rotate at the same speed and through the same distance as the driven element of the clutch when the slidable sleeve 55 is connected to the gear 41; when the sleeve 55 is connected to the gear 42 the shaft will rotate through three-fourths of a revolution, and when the sleeve 55 is connected to the gear 44 the shaft will rotate through one-half of a revolution.

Means is provided for moving the sleeve longitudinally along the shaft, said means comprising a collar 59 held between two flanges and provided with horizontal trunnions. These trunnions are engaged by the forks of a bifurcated arm 60. The arm is provided at its forward or lower end with means for loosely pivoting it on suitable bearings in the front or seeder frame. The arm with its support can be moved in its bearings longitudinally of the machine, and a spring 61 serves to normally hold it in its rearmost position. At the rear end of the support for the arm there is is an upwardly extending foot lever 62, which is provided with a lug adapted to enter V-shaped notches in a bracket 63, the spring 61 tending to force the lug into one or another of these notches and to thus lock the arm and the sleeve against movement. The operator, by pressing on the lever with his foot, can release the arm 60 and adjust it to move the sleeve 55 to one or another of its several operative positions.

In the present construction in which the driven member of the clutch is journaled on the driving member of the clutch, when the clutch members are engaged the toggle action which is set up between the driving and driven members of the clutch that has been before referred to is resisted entirely by such driving and driven members themselves in view of the fact that one of said members is journaled on the other, and, therefore, such toggle action is not transmitted to the seed selecting shaft 7, as would be the case if both of the clutch members were journaled directly on the seeder shaft. In this connection it is well to point out that this same result could be accomplished by journaling the driving member 14 on the driven member 18 and journaling the driven member on the seeder shaft, or both the driving and driven members could be journaled on a common third member, in which case the common third member would resist relative displacement of the driving and driven members of the clutch. By this construction, therefore, the seed selecting shaft is relieved of all shearing stresses and can rotate freely in its bearings without any interference, thus providing a structure capable of more accurate seed selection, particularly when the shaft is rotated at a slower speed than the clutch members in two of the settings of the sleeve 55 as above described.

Furthermore, by providing the driving member 14 of the clutch with the long bearing sleeve 15 which is journaled in the annular bearing flange 20 formed integral with and extending inwardly from the side wall of the housing member 8, supporting the driven member of the clutch on the driving member thereof, providing the bearing support for the gear 44 in the annular recess 48 formed in the side wall of the housing member 9, and the bearing support for the intermediate gear 42 through offset portions complemental to offset portions 46 on the gear 44 and offset portions 43 of gear 41 formed integral with the driven member 18 of the clutch, a connection is provided from the driving member 14 of the clutch to the opposite side of the housing to hold the driving member 14 in axial alinement with the seed selecting shaft at all times against the pull of the driving chain 17. By this construction, therefore, the seed selecting shaft 7 is relieved of all frictional engagement with the clutch members and rotates freely in the opening in the driving member in which it is journaled.

In the present construction also, by mounting the clutch throw-out arm within the housing and not directly on the rock shaft, and connecting such throw-out arm with the rock shaft by means of the mechanism above described, the housing can be supplied with lubricant whereby the several parts within the housing are kept properly lubricated at all times, and the openings through which loss of lubricant may occur has been reduced to a minimum.

I claim:

1. In a planter, the combination with a supporting frame and an intermittently acting seeder mechanism adapted at each of its operations to deliver at will either of a predetermined variable number of seeds one at a time, of a shaft mounted on said frame for imparting optionally variable movements to the seeder mechanism, a lubricant tight casing mounted on said frame and through which said shaft extends, a clutch mechanism in said casing and having one element thereof journaled on said shaft, a driving chain for constantly driving the driving element of the clutch, a series of gears for driving the shaft, means driven from the driven clutch element for driving said gears at different speeds, and means formed integral with said casing and with certain of said gears for holding said clutch elements and said driving gears in axial alinement with said shaft whereby friction between said shaft and the clutch element journaled thereon caused by the pull of said driving chain is eliminated.

2. The combination with a planter comprising seed carrying and delivering mechanism and a shaft for actuating said mechanism, of a casing through which said shaft extends, clutch mechanism in said casing comprising driving and driven members for actuating said shaft and having its driving member journaled on said shaft, a chain for driving said driving clutch member, means for driving said shaft from said clutch mechanism at different speeds, said means comprising a driving gear fast on said driven clutch member, a second driving gear having journal mounting on said first driving gear, and a third driving gear having journal mounting on said second driving gear, and said driving clutch member and said third driving gear having journal mounting in said casing, whereby said clutch members and said driving gears are held in axial alinement with said shaft and the latter is not subject to friction caused by the pull of said driving chain on the driving clutch member journaled on the shaft.

3. The combination with a planter comprising seed carrying and delivering mechanism and a shaft for actuating said mechanism, of clutch mechanism supported on said shaft and comprising a constantly rotating driving member and a driven member adapted to be driven by said driving member, a lubricant tight casing enclosing said clutch mechanism, a series of gears in said casing for driving the shaft, means driven from said clutch mechanism for driving said gears at different speeds, means connecting the shaft at will with either of said driving gears whereby said shaft may be driven at different speeds, a rock shaft supported outside the casing, a countershaft within the casing, means on said countershaft for engaging and disengaging said clutch members, and means for actuating said countershaft from said rock shaft.

4. The combination with a planter comprising seed carrying and delivering mechanism and a shaft for actuating said mechanism, of clutch mechanism supported on said shaft and comprising a constantly rotating driving member and a driven member adapted to be driven by said driving member, a lubricant tight casing enclosing said clutch mechanism, a series of gears in said casing for driving the shaft, means driven from said clutch mechanism for driving said gears at different speeds, means connecting the shaft at will with either of said driving gears whereby said shaft may be driven at different speeds, a rock shaft supported outside the casing, a countershaft within the casing, means on said countershaft for engaging and disengaging said clutch members, and means for actuating said countershaft from said rock shaft, said last mentioned means including a lost motion connection.

5. A planter comprising in combination, a shaft and clutch mechanism for driving said shaft, said clutch mechanism comprising a constantly rotating driving member and a driven member adapted to be connected with said shaft for driving the same, a lubricant tight casing enclosing said clutch mechanism, means in the casing for engaging said clutch members, a lever disposed in and journaled for rocking movement on said casing for actuating said engaging means, and a rock shaft outside the casing for actuating said lever.

6. A planter comprising in combination, a shaft and clutch mechanism for driving said shaft, said clutch mechanism comprising a constantly rotating driving member and a driven member adapted to be connected with said shaft for driving the same, a lubricant tight casing enclosing said clutch mechanism, means supported on the casing on the interior thereof for engaging said clutch members, a lever also supported on the casing on the interior thereof for actuating said engaging means, a rock shaft outside the casing for actuating said lever, and means for operating said lever from said rock shaft.

7. A planter comprising in combination, a shaft and clutch mechanism for driving said shaft, said clutch mechanism comprising a constantly rotating driving member and a driven member adapted to be connected with said shaft for driving the same, said clutch members being journaled one on the other whereby the reaction set up between said clutch members when they are engaged is resisted wholly by the clutch members and prevents shearing stress being imposed on said shaft, means for engaging said clutch members, a lever for actuating said engaging means, a rock shaft for actuating said lever, and lost motion connecting means between said lever and said rock shaft providing for delayed return motion of said lever relative to the return motion of said rock shaft, said lost motion connecting means including a countershaft connected with said lever, an arm fast on said countershaft, a hub member extending laterally from said arm, a second arm journaled on said hub member, and a link pivotally connecting said second arm with said rock shaft.

8. A planter comprising in combination, a shaft and clutch mechanism for driving said shaft, said clutch mechanism comprising a constantly rotating driving member and a driven member adapted to be connected with said shaft for driving the same, said clutch members being journaled one on the other whereby the reaction set up between said clutch members when they are engaged is resisted wholly by the clutch members and prevents shearing stress being imposed on said shaft, a housing enclosing said clutch members, and means for engaging said clutch members, said means comprising a countershaft supported in said housing and having one end extending outside of said housing, a lever fast on said countershaft within the housing, a rock shaft, and means for rotating said countershaft to actuate said lever upon actuation of said rock shaft.

9. In combination, a shaft, clutch mechanism comprising a continuously rotating driving member and a driven member adapted to be operatively connected with said driving member, a gear fixed to said driven member for driving said shaft from said driven member, said clutch members being disposed coaxially of said shaft, and a casing enclosing said clutch mechanism, said driving member being rotatably supported on said casing and said driven member being journaled on said driving member.

10. The combination with a planter comprising seed carrying and delivering mechanism and a shaft for actuating said mechanism, of a casing, said shaft extending through said casing, clutch mechanism disposed in said casing and having a driving member disposed about said shaft and supported for rotation in said casing independently of said shaft, means for driving said clutch member, a plurality of optionally operable pairs of gears disposed in said casing and arranged to drive said shaft at different speeds from said clutch mechanism, and means for supporting said gears from said clutch mechanism and said casing independently of said shaft.

11. The combination with a planter comprising seed carrying and delivering mechanism and a shaft for actuating said mechanism, of a casing, clutch mechanism disposed in said casing and having a driving member disposed about said shaft and supported for rotation in said casing independently of said shaft, means for driving said clutch member, a series of gears in said casing, means driven from the clutch mechanism for driving said gears, a sliding sleeve carried by said shaft and adapted to optionally connect said gears with said shaft for driving said shaft from said gears, and means for supporting said gears from said clutch mechanism and said casing independently of said shaft.

12. The combination with a planter comprising seed carrying and delivering mechanism and a shaft for actuating said mechanism, of a casing, clutch mechanism disposed in said casing and having a driving member disposed about said shaft and supported for rotation in said casing independently of said shaft, means for driving said clutch member, a series of gears in said casing, means driven from the clutch mechanism for driving said gears, a sliding sleeve carried by said shaft and adapted to optionally connect said gears with said shaft for driving said shaft from said gears, and means for operating said clutch mechanism.

13. The combination with a planter comprising seed carrying and delivering mechanism and a shaft for actuating said mechanism, of a casing, clutch mechanism comprising driving and driven members disposed in said casing and having its driving member disposed about said shaft and supported for rotation in said casing independently of said shaft, means for driving said driving clutch member, a series of gears in said casing, means for driving said gears from said driven clutch member, a sliding sleeve carried by said shaft and adapted to optionally connect said gears with said shaft for driving said shaft from said gears, and means for supporting said gears from said clutch mechanism and said casing independently of said shaft.

14. In a planter, the combination with a supporting frame and an intermittently acting seeder mechanism adapted at each of its operations to deliver at will either of a predetermined variable number of seeds one at a time, of a shaft mounted on said frame for imparting optionally variable movements to the seeder mechanism, a casing mounted on said frame and through which said shaft extends, a clutch mechanism in said casing and having one element thereof journaled on said shaft, means for driving the driving element of the clutch, a series of gears for driving the shaft, means driven from the driven clutch element for driving said gears at different speeds, and means formed integral with said casing and with certain of said gears for holding said clutch elements and said driving gears in axial alinement with said shaft whereby friction between said shaft and the clutch element journaled thereon caused by the force of said driving means is eliminated.

15. In an agricultural machine having driving and driven parts, the combination of one-cycle clutch means adapted to connect said parts together in driving relation, intermittently operable means movable from one position to another to engage said clutch means, and lost motion connecting means between said intermittent means and said clutch means and comprising a countershaft for actuating said clutch means, an arm fast on said countershaft, a hub member extending laterally from said arm, a second arm journaled on said hub member, and means connecting said second arm with said intermittently operable means.

16. A planter comprising in combination, a shaft and clutch mechanism for driving said shaft, said clutch mechanism comprising a constantly rotating driving member and a driven member adapted to be connected with said shaft for driving the same, a housing enclosing said clutch members, and means for engaging said clutch members, said means comprising a countershaft supported in said housing and having one end extending outside of said housing, a lever fast on said countershaft within the housing, a rock shaft, and means for rotating said countershaft to actuate said lever upon actuation of said rock shaft.

17. The combination with a planter comprising seed carrying and delivering mechanism and a shaft for actuating said mechanism, of a casing, said shaft extending through said casing, clutch mechanism disposed in said casing and having a driving member disposed about said shaft and supported for rotation in said casing independently of said shaft, means for driving said clutch member, and means in said casing to drive said shaft at different speeds from said clutch mechanism and including a gear supported on said clutch mechanism independently of said shaft.

18. In an agricultural machine having driving and driven parts, the combination of one-cycle clutch means adapted to connect said parts together in driving relation, intermittently operable means movable from one position to another to engage said clutch means and including a rockable member, and lost motion connecting means between said intermittent means and said clutch means comprising a second rockable control member for initiating the operation of said clutch means responsive to a rocking of said second member, an arm fast on one of said rockable members, a second arm swingable relative to the last named member, and means connecting said second arm with the other of said rockable members.

19. In an agricultural machine having driving and driven parts, the combination of one-cycle clutch means adapted to connect said parts together in driving relation, intermittently operable means movable from one position to another to engage said clutch means including a rock shaft, and lost motion connecting means between said rock shaft and said clutch means comprising a rockable countershaft for controlling said clutch means, an arm fast on one of said shafts, a second arm swingable relative to the last named shaft, and means connecting said second arm with the other of said shafts.

CHARLES H. WHITE.